United States Patent [19]

Greenwalt

[11] Patent Number: 5,429,658
[45] Date of Patent: Jul. 4, 1995

[54] METHOD OF MAKING IRON FROM OILY STEEL AND IRON FERROUS WASTE

[75] Inventor: Richard B. Greenwalt, Danville, Calif.

[73] Assignee: Bechtel Group, Inc., San Francisco, Calif.

[21] Appl. No.: 218,792

[22] Filed: Mar. 28, 1994

Related U.S. Application Data

[63] Continuation-in-part of Ser. No. 194,898, Feb. 14, 1994, which is a continuation of Ser. No. 84,853, Jun. 30, 1993, Pat. No. 5,338,336, which is a continuation-in-part of Ser. No. 56,341, Apr. 30, 1993, Pat. No. 5,259,865, which is a continuation-in-part of Ser. No. 991,914, Dec. 17, 1992, Pat. No. 5,354,356, which is a continuation-in-part of Ser. No. 958,043, Oct. 6, 1992, Pat. No. 5,259,864.

[51] Int. Cl.⁶ ............................................. C21B 13/00
[52] U.S. Cl. .................................... 75/445; 75/581
[58] Field of Search ................... 75/445, 446, 571, 581

[56] References Cited

U.S. PATENT DOCUMENTS

| | | | |
|---|---|---|---|
| 3,850,615 | 11/1974 | Reeves | 75/26 |
| 4,070,181 | 1/1978 | Widell | 75/91 |
| 4,073,642 | 2/1978 | Collin et al. | 75/35 |
| 4,259,178 | 3/1981 | Wynne, Jr. et al. | 208/131 |
| 4,389,043 | 6/1983 | Weber et al. | 266/218 |
| 4,412,840 | 11/1983 | Goksel | 44/10 |
| 4,448,402 | 5/1984 | Weber et al. | 266/183 |
| 4,588,437 | 5/1986 | Kepplinger et al. | 75/43 |
| 4,600,434 | 7/1986 | Kleimeyer et al. | 75/58 |
| 4,605,205 | 8/1986 | Langner et al. | 266/160 |
| 4,695,318 | 9/1987 | Knauss, Jr. et al. | 75/51 |
| 4,725,308 | 2/1988 | Kepplinger | 75/26 |
| 4,744,875 | 5/1988 | Blander et al. | 204/140 |
| 4,793,855 | 12/1988 | Hauk | 75/26 |
| 4,806,158 | 2/1989 | Hirsch et al. | 75/26 |
| 4,822,411 | 4/1989 | Standler et al. | 75/35 |
| 4,849,015 | 7/1989 | Fassbinder et al. | 75/26 |
| 4,853,034 | 8/1989 | Quigley | 75/58 |
| 4,874,427 | 10/1989 | Hamada et al. | 75/26 |
| 4,889,323 | 12/1989 | Pusch et al. | 266/142 |
| 4,895,593 | 1/1990 | Sulzbacher et al. | 75/446 |
| 4,897,179 | 1/1990 | Mori et al. | 208/127 |
| 4,913,733 | 4/1990 | Hauk | 75/491 |
| 4,946,498 | 8/1990 | Weber | 75/26 |
| 4,957,545 | 9/1990 | Hikosaka et al. | 75/501 |
| 5,259,864 | 11/1993 | Greenwalt | 75/445 |

FOREIGN PATENT DOCUMENTS

| | | |
|---|---|---|
| 839176 | 4/1970 | Canada . |
| 843861 | 6/1970 | Canada . |
| B10010627 | 2/1981 | European Pat. Off. . |
| 0468950A2 | 1/1991 | European Pat. Off. . |
| 1458306 | 8/1963 | Germany . |
| 2146434 | 9/1971 | Germany . |
| 6814281 | 10/1968 | Netherlands . |

OTHER PUBLICATIONS

Fleichtner, Hanns et al., "The Corex Process", *Skillings' Mining Review*, Jan. 14, 1989, pp. 20–27.

*Primary Examiner*—Melvyn Andrews
*Attorney, Agent, or Firm*—Townsend and Townsend Khourie and Crew

[57] ABSTRACT

The invention relates to a method for processing environmentally undesirable materials including petroleum coke and the sulfur and heavy metals contained therein and oily steel and iron ferrous waste from machine shop and steel and iron processing to provide fuel and a charging material for a process of making molten iron or steel preproducts and reduction gas in a melter gasifier.

16 Claims, 2 Drawing Sheets

METHOD OF MAKING IRON FROM OILY STEEL AND IRON FERROUS WASTE

This application is a continuation in part of U.S. patent application Ser. No. 08/194,898, filed Feb. 14, 1994; which is a Rule 60 continuation of Ser. No. 08/084,853, filed Jun. 30, 1993 now U.S. Pat. No. 5,338,366; which is a continuation in part of Ser. No. 08/056,341, filed Apr. 30, 1993, now U.S. Pat. No. 5,259,865; which is a continuation in part of Ser. No. 07/991,914, filed Dec. 17, 1992 now U.S. Pat. No .5,354,356; which is a continuation in part of Ser. No. 07/958,043 filed Oct. 6, 1992, now U.S. Pat. No. 5,259,864.

BACKGROUND OF THE INVENTION

The invention relates to a method for processing environmentally undesirable materials including petroleum coke and the sulfur and heavy metals contained therein and oily steel and iron ferrous waste from machine shop and steel and iron processing to provide fuel and a charging material for a process of making molten iron or steel preproducts and reduction gas in a melter gasifier.

Petroleum coke is a product of refinery operations and is produced in the United States utilizing three types of coke processing technology. Specifically these technologies as known to one skilled in the art are delayed, fluid and flexi. By far most petroleum coke in the United States is produced using delayed technology. In 1990, according to the U.S. Department of Energy, 55 refineries in the United States which had coking facilities and a refinery capacity of 8 million barrels per day produced slightly over 76,000 short tons per day of petroleum coke. The residual petroleum coke produced amounted to about 6% by weight of each barrel of crude oil processed by the refineries.

Petroleum coke is generally the bottom end of refinery operations after most of the light ends and oils have been recovered from the original crude. The make up of petroleum coke will vary depending on a number of factors including the crude being processed and the process being utilized. Generally on a dry basis petroleum coke will be composed largely (approximately 90%) of fixed carbon and typically include sulfur (0.05% to 6%) and nitrogen (2% to 4%). Various metals typically including vanadium, iron and nickel are found in petroleum coke. Usually, a typical petroleum coke contains about 10% volatile matter. Petroleum coke contains up to 10 to 15% moisture before drying.

Petroleum coke is produced either as blocky sponge coke or needle coke from delayed cokers or in a shot size form from fluid bed cokers. Sponge coke from delayed cokers is by far the most important coke produced in the United States. Calcined sponge coke is used primarily in the manufacture of graphite electrodes, anodes and shaped products. Approximately one-fourth of the sponge coke production is used in these products.

Until recent years the remainder of the petroleum coke in the U.S. was used as fuel for power plants and cement kilns. However due to the high sulfur content, the need for blending with coal to maintain ignition and flame stability and environmental problems, petroleum coke has become less suitable as a boiler fuel. The high sulfur content of petroleum coke also poses problems for cement kilns. Excess sulfur will cause finished concrete to expand and crack and also influences setting time. The high vanadium content also poses refractory problems. Thus there is a substantial amount of excess petroleum coke which must be disposed. The high sulfur content and the relatively high amounts of metals such as vanadium and nickel make such disposal a real environmental problem which the present invention is directed to solving.

Oily steel and iron waste include turnings and borings which are a byproduct of machine shop and steel plant processing of steel and cast iron into usable end products. The iron bearing turnings and borings have heretofore been recycled in minor metered amounts onto the ironmaking blast furnace, electric arc furnace or sinter plant, but are objectionable because hydrocarbons from the oily machine lubricants are not completely reformed in these processes creating contaminants in the blast furnace, electric arc furnace and sinter plant gas cleaning systems.

The oily contaminants pollute the water in the wet scrubber systems and clog the bag filters in the dry gas cleaning systems. Tars from the hydrocarbons build up in the furnace and sinter plant ductwork and can cause fires and explosions. In addition, partially combusted hydrocarbons, especially in sintering, cause carbon monoxide, a hazardous gas to form at high levels in the stack gases. Carbon monoxide (CO) is poisonous and is now regulated at 100 tons per stack per year. A 1,000,000 nt/y sinter plant with a partial charge of oily turnings will exhaust over 300 tons of CO to the atmosphere at a 120 ppm contamination level commonly experienced with sinter plants.

Other high temperature disposal systems, such as cement kilns, are subject to the same objectionable pollution with early release of volatized hydrocarbons and CO contamination of exhaust gases requiring installation of expensive secondary combustion systems for their elimination. Turnings and borings charged to an electric arc furnace as scrap flash off voluminous quantities of unburned hydrocarbons and CO from the contained oils. Reuse or disposal of the oily steel and iron waste products has heretofore been a problem.

There is a need therefore for developing a liquid iron making process which will dispose of petroleum coke and permit recycling of oily iron and steel waste material.

U.S. Pat. No. 4,849,015 to Fassbinder et al. discloses a method for two-stage melt reduction of iron ore, in which iron ore is prereduced substantially to wustite and at the same time melted down in a melting cyclone, and then liquid hot metal is produced in an iron bath reactor connected to the outlet of the melting cyclone and receiving the melted wustite by adding carbonaceous fuels and oxidizing gas to the melt. The resulting reaction gas from the melt is afterburned, and the dust-laden, partly burned reaction gases from the iron bath reactor are accelerated and further afterburned by adding a hot blast with a temperature of 800° C. to 1500° C., and at least a portion of such accelerated, after burned reaction gases are introduced into the melting cyclone to reduce and melt fresh iron ore.

Carbonaceous fuels, such as coke, carbonized lignite, petroleum coke, etc., but preferably coal of varying quality, are fed to the melt in the iron bath reactor. Slag-forming additives, such as lime, fluorspar, etc., are also fed to the iron melt to set the desired slag composition.

U.S. Pat. No. 4,806,158 to Hirsch et al. discloses a process for the production of reduced iron oxide-containing materials. Iron oxide and solid carbonaceous reducing agent are charged into a first expanded fluidized bed, which is supplied with an oxygen-containing fluidizing gas. The gas residence time selected is controlled in the reactor containing the first fluidized bed so that the reduction potential will result in a reduction of the iron oxide material not in excess of the FeO stage. A gas-solids suspension discharged from the first fluidized bed is supplied to a second expanded fluidized bed, which is supplied with a strongly reducing fluidizing gas. Strongly reducing gas and a major portion of the resulting devolatilized carbonaceous material are discharged from the upper portion of the second fluidized bed. Reduced material having a metallization of 50 to 80% and the remaining devolatilized carbonaceous material are discharged from the lower portion of the second fluidized bed. Suitable carbonaceous materials include all coals, from anthracite to lignite, carbonaceous minerals and waste products, such as oil shale, petroleum coke or washery refuse, provided that they are solid at room temperature. The oxygen-containing gas preferably consists of oxygen or of oxygen-enriched air.

U.S. Pat. No. 4,897,179 to Mori et al. provides a method of producing reduced iron and light oil from iron ore and heavy oil which comprises a thermal cracking step of subjecting heavy oil to thermal cracking while retaining iron ore particles in a fluidized state to produce light oil and simultaneously to deposit coke as by-product on the surface of the iron ore particles; a gasification step of putting the coke-deposited ore in contact with an oxidizing gas including steam and oxygen in a fluidized state to react the coke with the gas thereby to produce a reducing gas containing hydrogen and carbon monoxide and of heating the coke-deposited ore upward of a reduction temperature of iron ore by partial oxidization of the coke; and a reduction step of reducing the coke-deposited iron ore in a fluidized state by the reducing gas to produce reduced iron. When the gasification step is performed by an oxidizing gas containing a majority of steam and up to 15 vol. %, based on the steam, of oxygen at 800°–1000° C. under a pressure of 0–10 kg/cm$^2$G, a reducing gas containing high-concentration hydrogen gas is obtained.

Slags of high sulfur capacity have been utilized in applications associated with ferrous metallurgy. Kleimeyer et al. in U.S. Pat. No. 4,600,434 describe the use of high sulfur capacity slag and magnesium metal to desulfurize molten iron while it is contained in a torpedo car. Quigley, U.S. Pat. No. 4,853,034, describes using a vanadium-bearing, high-magnesia synthetic calcium aluminate slag for absorbing sulfur during ladle refining of steel. Knauss et al., U.S. Pat. No. 4,695,318, describe using a synthetic slag similar to that of U.S. Pat. No. 4,853,034, and the refractory brick of the ladle itself, to desulfurize molten iron contained in said ladle.

In recent years methods utilizing a melter gasifier have been developed to produce molten iron or steel preproducts and reduction gas. Most of these processes utilize a coal fluidized-bed. A high temperature is produced in the melter gasifier utilizing coal and blown in oxygen to produce a fluidized bed and iron sponge particles are added from above to react in the bed to produce the molten iron.

Thus in European Patent B1-0010627, a coal fluidized-bed with a high-temperature zone in the lower region is produced in a melter gasifier, to which iron sponge particles are added from above. On account of the impact pressure and buoyancy forces in the coal fluidized-bed, iron sponge particles having sizes greater than 3 mm are considerably braked and substantially elevated in temperature by the heat exchange with the fluidized bed. They impinge on the slag layer forming immediately below the high-temperature zone at a reduced speed and are melted on or in the same. The maximum melting performance of the melter gasifier, and thus the amount and temperature of the molten iron produced, not only depends on the geometric dimensions of the melter gasifier, but also are determined to a large extent by the quality of the coal used and by the portion of larger particles in the iron sponge added. When using low-grade coal, the heat supply to the slag bath, and thus the melting performance for the iron sponge particles, decline accordingly. In particular, with a large portion of iron sponge particles having grain sizes of about 3 mm, which cannot be heated to the same extent as smaller particles by the coal fluidized-bed when braked in their fall and which, therefore, necessitate a higher melting performance in the region of the slag layer, the reduced melting performance has adverse effects in case low-grade coal is used.

A melter gasifier is an advantageous method for producing molten iron or steel preproducts and reduction gas as described in U.S. Pat. No. 4,588,437. Thus there is disclosed a method and a melter gasifier for producing molten iron or steel preproducts and reduction gas. A first fluidized-bed zone is formed by coke particles, with a heavy motion of the particles, above a first blow-in plane by the addition of coal and by blowing in oxygen-containing gas. Iron sponge particles and/or pre-reduced iron ore particles with a substantial portion of particle sizes of more than 3 mm are added to the first fluidized-bed zone from above. A melter gasifier for carrying out the method is formed by a refractorily lined vessel having openings for the addition of coal and ferrous material, openings for the emergence of the reduction gases produced, and openings for tapping the metal melt and the slag. Pipes or nozzles for injection of gases including oxygen enter into the melter gasifier above the slag level at at least two different heights.

Another process utilizing a melter gasifier is described in U.S. Pat. No .4,725,308. Thus there is disclosed a process for the production of molten iron or of steel preproducts from particulate ferrous material as well as for the production of reduction gas in the melter gasifier. A fluidized-bed zone is formed by coke particles upon the addition of coal and by blowing in oxygen-containing gas by nozzle pipes penetrating the wall of the melter gasifier. The ferrous material to be reduced is introduced into the fluidized bed. In order to be able to produce molten iron and liquid steel preproducts in a direct reduction process with a lower sulfur content of the coal used, the ferrous material to be reduced is supplied closely above the blow-in gas nozzle plane producing the fluidized bed. An arrangement for carrying out the process includes a melter gasifier in which charging pipes penetrating its wall are provided in the region of the fluidized-bed zone closely above the plane formed by the nozzle pipes. The ferrous material to be melted as well as the dusts separated from the reduction gas and, if desired, fluxes containing calcium oxide, magnesium oxide, calcium carbonate and/or magnesium carbonate are introduced therethrough.

There is also a process known as the COREX® process (COREX® is a trademark of Deutsche Voest- Alpine Industrieanlagenbau GMBH and Voest-Alpine Industrieanlagenbau). This process is described in *Skilling's Mining Review*, Jan. 14, 1989 on pages 20-27. In the COREX® process the metallurgical work is carried out in two process reactors: the reduction furnace and the melter gasifier. Using non-coking coals and iron bearing materials such as lump ore, pellets or sinter, hot metal is produced with blast furnace quality. Passing through a pressure lock system, coal enters the dome of the melter gasifier where destructive distillation of the coal takes place at temperatures in the range of 1,100°-1,150° C. Oxygen blown into the melter gasifier produces a coke bed from the introduced coal and results in a reduction gas consisting of 95% CO+$H_2$ and approximately 2% $CO_2$. This gas exits the melter gasifier and is dedusted and cooled to the desired reduction temperature between 800° and 850° C. The gas is then used to reduce lump ores, pellets or sinter in the reduction furnace to sponge iron having an average degree of metalization above 90%. The sponge iron is extracted from the reduction furnace using a specially designed screw conveyor and drops into the melter gasifier where it melts to the hot metal. As in the blast furnace, limestone adjusts the basicity of the slag to ensure sulfur removal from the hot metal. Depending on the iron ores used, $SiO_2$ may also be charged into the system to adjust the chemical composition and viscosity of the slag. Tapping procedure and temperature as well as the hot metal composition are otherwise exactly the same as in a blast furnace. The top gas of the reduction furnace has a net calorific value of about 7,000 KJ/$Nm^3$ and can be used for a wide variety of purposes.

The fuels used in these processes are typically described as a wide variety of coals and are not limited to a small range of coking coal. The above-noted article from *Skilling's Mining Review* notes that petroleum coke suits the requirements of the COREX® process. Brown coal and steam coal which are relatively poor quality coal having a relatively high ash content i.e. plus 15%, have been identified as suitable for use in these processes. Coke made from coal has also been identified as a fuel for many of the processes utilizing melter gasifiers.

SUMMARY OF THE INVENTION

The present invention is directed to a method for the disposal of two environmentally objectionable materials and provision of a new and unexpectedly superior fuel source and of a ferrous material source for processes utilizing melter gasifiers to make molten iron or steel preproducts.

In accordance with the invention it has been found that petroleum coke makes an excellent source of carbon in processes making molten iron or steel preproducts in which a melter gasifier unit is used. Further, oily steel and iron waste provide a source of ferrous material which is added directly to the melter gasifier and is converted to molten iron. Moreover, the reaction in these processes conducted at a temperature of at least 1050° C. and utilizing the petroleum coke as a fuel in the melter gasifier tends to gasify the petroleum coke substantially completely as well as completely vaporize and reform the hydrocarbons to CO and hydrogen from the oily waste with hot reduction gas as the only gaseous product. The hot reduction gas from the molten gasifier is cooled to a suitable temperature such as 850° C. and may be flowed to a primary reduction furnace where iron ore or other iron oxides are metallized and may be then utilized in the melter gasifier along with the oily ferrous waste material. Residual sulfur from the petroleum coke is discharged as a sulfide in the slag formed in the melter gasifier and is removed and disposed of with the slag. Heavy metals from the petroleum coke are carried over in stable form in solution in the molten iron or steel preproducts and will solidify therewith.

In a broad aspect the invention provides a method for converting oily steel and iron ferrous waste to liquid iron in an environmentally acceptable manner. Petroleum coke is introduced into a melter gasifier along with an oxygen containing gas. The petroleum coke is combusted to form at least a first fluidized bed of coke particles. Oily steel and iron ferrous waste are introduced into the melter gasifier. The petroleum coke and oily ferrous waste mixture are reacted with oxygen at a temperature of at least 1050° C. in the melter gasifier to gasify the major portion of the petroleum coke, vaporize and reform the hydrocarbons to CO and hydrogen from the oily ferrous waste and produce reduction gas and molten iron containing heavy metals freed from combustion of the petroleum coke. The reaction temperature is preferably about 1100° C. Reduced iron ore may be introduced into the melter gasifier concurrently with the oily steel waste.

In one form the oily waste material comprises up to 25% of the ferrous charge mixture to the melter gasifier with a supplementary reduced iron feed. The invention provides a method for processing environmentally undesirable materials including petroleum coke and the sulfur and heavy metals contained therein and oily steel and iron waste material by providing fuel and a charging material for a process of making molten iron or steel preproducts and reduction gas in a melter gasifier. A melter gasifier is provided and has an upper fuel charging end, a reduction gas discharging end, a lower molten metal and slag collection end. Entry means are provided for charging material into the melter gasifier. Petroleum coke is introduced into the melter gasifier at the upper fuel charging end. Oxygen-containing gas is blown into the petroleum coke to form at least a first fluidized bed of coke particles from the petroleum coke. Oily steel waste is charged into the melter gasifier through the entry means. Petroleum coke, oily steel waste and oxygen are reacted in the melter gasifier to combust the major portion of the petroleum coke to produce liquid iron and reduction gas which may be directed to a reduction furnace. In the reduction furnace, the reduction gas may be used to reduce iron ore or other iron oxides to metallize the iron. The metallized iron is discharged hot to the melter gasifier for melting with petroleum coke and oxygen along with the oily steel waste. The molten iron contains heavy metals freed from combustion of the petroleum coke. A slag is produced containing sulfur freed from combustion of the petroleum coke.

OBJECTS OF THE INVENTION

It is a particular object of the present invention to provide a process for both disposing of two environmentally undesirable materials and providing a novel fuel and ferrous material feedstock for an iron making process which utilizes a melter gasifier. Other objects and advantages of the present invention will be apparent from the following detailed description read in view of the accompanying drawings which are made a part of this specification.

DESCRIPTION OF THE PREFERRED EMBODIMENT

The invention is predicated on the recognition that petroleum coke can advantageously be used as a source of carbon in iron making processes wherein a melter gasifier is used and oily steel and iron waste material can be effectively disposed of in such a process while providing a source of ferrous material for use in iron making. In addition, the use of petroleum coke in the iron making process in a melter gasifier substantially completely gasifies the petroleum coke and evaporates and reforms the hydrocarbons to CO and hydrogen from the oily waste thus solving an environmentally sensitive disposal problem. Sulfur and heavy metals which are contained in petroleum coke are also safely disposed of in accordance with the invention. Further, the oily ferrous waste can be safely and economically disposed of in the process while providing a source of ferrous material for iron production.

Figure 1:
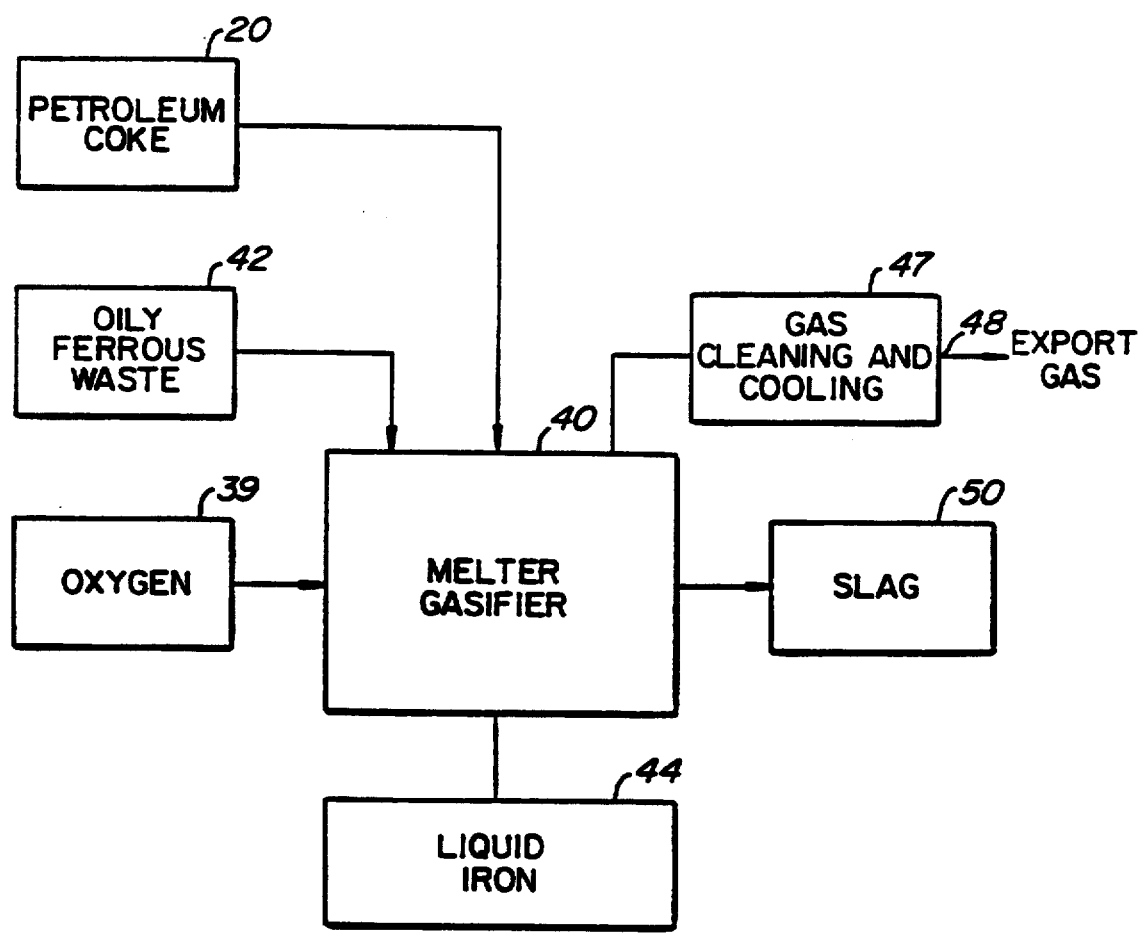
FIG. 1 is a flow diagram illustrating a system assembled in accordance with the present invention for converting an oily ferrous waste charge to liquid iron.
Figure 2:
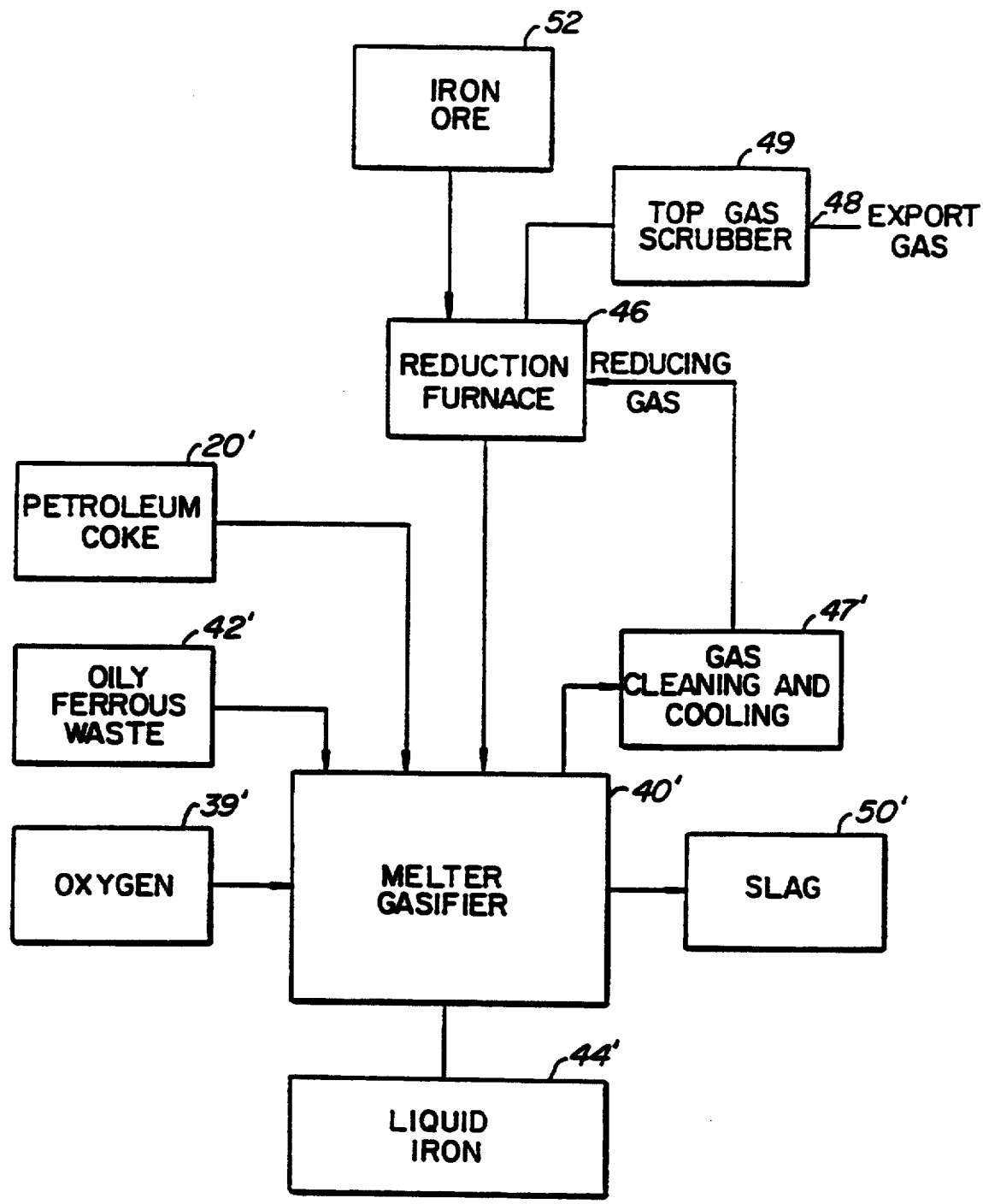
FIG. 2 is a flow diagram illustrating a system assembled in accordance with the present invention for converting a combined ferrous charge, including oily ferrous waste material and reduced iron ore, to liquid iron.

FIGS. 1 and 2 are flow diagrams illustrating systems for producing iron in an environmentally desirable manner wherein undesirable materials resulting in such production, namely petroleum coke and oily steel and iron waste, are disposed of in the iron making process. Heretofore, disposal of the petroleum coke and oily steel and iron waste have been a significant problem. However, in accordance with the invention, disposal of the petroleum coke is accomplished in an advantageous manner as a fuel and oily ferrous waste material as a ferrous source in an iron-making process where a melter gasifier is utilized. FIG. 1 is a flow diagram illustrating a system assembled in accordance with the present invention for converting an oily ferrous waste charge to liquid iron; and FIG. 2 is a flow diagram illustrating a system assembled in accordance with the present invention for converting a combined ferrous charge, including oily ferrous waste material and reduced iron ore, to liquid iron. For ease of reference, elements in the figures which are similar are given the same number but with a ' in FIG. 2.

Thus, petroleum coke from source 20 is introduced as a fuel into melter gasifier 40 for combustion with oxygen and oily steel and iron waste from source 42 which has been acquired, for example, from steel processing plants. Liquid iron containing heavy metals freed from the combustion of the petroleum coke is recovered in collection vessel 44 for later steel making or other uses. A reduction gas, rich in CO, is produced from the melter gasifier and after cleaning and cooling may be directed to a reduction furnace 46 as shown in FIG. 2 and used in direct reduction of iron ore from source 52. The reduction gas from the reduction furnace 40 may be cleaned and scrubbed at 47 and become an export gas 48 and used as a fuel for power production or other uses as illustrated in FIG. 1. As shown in FIG. 2, the top gas from the reduction furnace 46 may be scrubbed 51 and exported 49. Slag is withdrawn from the melter gasifier 40 at slag collection vessel 50. The slag contains the sulfur freed from the combustion of the petroleum coke. Slag is disposed of, for example, by forming construction products.

Thus a new approach is proposed for the recycle and recovery of low cost oily ferrous waste comprising turnings and borings from steel manufacturing and for producing liquid iron and a fuel gas by using a melter gasifier with petroleum coke as solid fuel. The oily turnings and borings are a byproduct of machine shop and steel plant processing of steel and cast iron into usable end products. The iron bearing turnings and borings are commonly recycled in minor metered amounts onto the ironmaking blast furnace, electric arc furnace or sinter plant, but are objectionable because hydrocarbons from the oily machining lubricants volatilize creating contaminants in the blast furnace, electric arc furnace and sinter plant gas cleaning systems.

The oily contaminants pollute the water in the wet scrubber systems and clog the bag filters in the dry gas cleaning systems. Tars from the hydrocarbons build up in the furnace and sinter plant ductwork and can cause fires and explosions. In addition, partially combusted hydrocarbons, especially in sintering, cause carbon monoxide, a hazardous gas to form at high levels in the stack gases. Carbon monoxide (CO) is poisonous and is now regulated at 100 tons per stack per year. A 1,000,000 nt/y sinter plant with a partial charge of oily turnings will exhaust over 300 tons of CO to the atmosphere at a 120 ppm contamination level commonly experienced with sinter plants.

By feeding these oily ferrous metal wastes into a melter gasifier 40, all the objectionable hydrocarbon contamination is eliminated. The oily scrap wastes are injected directly into the gasifier at at least about 1050° C. and preferably 1100° C. and the hydrocarbons are immediately flashed off and reformed to CO and hydrocarbon gases within the chamber. The CO and hydrogen gases from the hydrocarbons combine with the other reducing gas produced by the gasifier and are discharged as export fuel gas or for use as a reduction gas in the process.

The primary processing required for feeding the turnings and borings into the ironmaking gasifier is shredding of the scrap into pieces less than two inches in the largest dimension. The shredding is for accommodation of the gasifier feed screws. The shredded turnings and borings are fed as a mixture with the petroleum coke or charged from a separate hopper.

The oily turnings and borings are a source of low cost iron units for ironmaking in that are already metallized and hence are not required to pass through a primary reduction furnace ahead of the ironmaking gasifier. Extra sensible heat is required to heat the shredded metal from ambient to 1100° C. in the gasifier dome. The contaminant hydrocarbons contribute to reducing the gasifier coolant requirements with petroleum coke and increasing the export gas output.

Petroleum coke, as opposed to coal, is the essential solid fuel for processing turnings and borings in the ironmaking gasifier. Because of the additional hydrocarbons from the oily ferrous waste, the use of turnings and borings with high volatile steam coal is limited. As petroleum coke has only 10% of volatile matter, 90% fixed carbon and a heating value 25% greater than a normal steam coal, the extra heat can be utilized to heat the shredded metal to 1100° C. and reform the additional hydrocarbons. Assuming the turnings and borings contain 1% of hydrocarbons, the metal waste can form up to 25% of the combined ferrous charge mixture. With an 30% excess of export gas by overblowing, up to 30% of turnings and borings can be added to the ferrous charge mixture for an increase of 30% in metal production from the ironmaking gasifier. Thus an 800,000 metric tons/year reduction furnace melter gasifier unit can be rerated to 950,000 to 1,050,000 metric tons/year when supplementally charged with oily ferrous waste of turnings and borings.

In the case of no direct reduced iron feed to the ironmaking gasifier from the reduction furnace, a metal charge consisting of 100% turnings and borings to the ironmaking gasifier is possible using low volatile petroleum coke to provide adequate fixed carbon for maintaining the gasifier hearth temperature at 1650° C. for accelerated slag and metal melting. In this embodiment, a rich (300 Btu/scf) fuel gas is discharged for desulfurizing and export.

In addition oily ferrous waste such as turnings and borings are relatively cheap at one-third to one-half the price of clean heavy melting scrap. Current price of clean heavy melting scrap in the Great Lakes Area may be three times the price of oily ferrous waste material. At this price, waste turnings and borings which have only to be melted are the same price per iron unit as the iron contained in iron oxide pellets which must be smelted for ironmaking. By utilizing 25% of waste oily turnings and borings on the ironmaking gasifier, a substantial savings per ton of liquid iron is available. With 100% oily waste turnings and borings on the melter gasifier, the liquid iron savings are two to three times greater. Thus, the economic advantages as well as the environmental advantages of the present invention are clear.

The present invention provides a method for processing environmentally undesirable materials including petroleum coke and the sulfur and heavy metals contained therein and oily steel and iron waste material and of providing fuel and a charging material for a process of making molten iron or steel preproducts and reduction gas in a melter gasifier. A melter gasifier 40 is provided and has an upper fuel charging end, a reduction gas discharging end, a lower molten metal and slag collection end. A reduction furnace 46 may be operably connected to the melter gasifiers. An entry is formed for charging metallized ferrous material into said melter gasifier 40 from a reduction furnace 46. Petroleum coke and oily steel and iron waste material are introduced into the melter gasifier at the upper fuel charging end and oxygen-containing gas from source 39 is blown into the petroleum coke to form at least a first fluidized bed of coke particles from the petroleum coke. Vaporized hydrocarbons from the oily ferrous waste are reformed and removed with the reduction gas. Metallized iron ore may be introduced into the melter gasifier through the material charging entry means. The petroleum coke, oxygen, oily ferrous waste and metallized iron ore are reacted to combust the major portion of the petroleum coke to produce reduction gas and molten iron. The molten iron contains the heavy metals freed from combustion of the petroleum coke. A slag is formed containing sulfur freed from combustion of the petroleum coke. The reduction gas is removed from the melter gasifier and may be used in the reduction furnace.

The principles, preferred embodiments and modes of operation of the present invention have been described in the foregoing specification. However, the invention which is intended to be protected is not to be construed as limited to the particular embodiments disclosed. The embodiments are to be construed as illustrative rather than restrictive. Variations and changes may be made by others without departing from the spirit of the present invention. Accordingly, all such variations and changes which fall within the spirit and scope of the present invention as defined in the following claims are expressly intended to be embraced thereby.

What is claimed is:

1. A method for converting oily hydrocarbon containing ferrous waste to liquid iron in an environmentally acceptable manner comprising the steps of introducing petroleum coke including the heavy metals contained therein into a melter gasifier; blowing oxygen containing gas into said melter gasifier and combusting petroleum coke to form at least a first fluidized bed of coke particles from said petroleum coke; introducing oily ferrous waste into said melter gasifier; and reacting the petroleum coke and oily steel waste mixture with oxygen at a temperature of at least 1050° C. in said melter gasifier to combust the major portion of said petroleum coke, vaporize the hydrocarbons from the oily waste and produce reduction gas and molten iron containing heavy metals freed from combustion of the petroleum coke.

2. The method of claim 1 further characterized in that the temperature of the reaction is about 1100° C.

3. The method of claim 1 further characterized in that reduced iron ore is introduced into said melter gasifier concurrently with said oily ferrous waste to form a ferrous charge mixture.

4. The method of claim 3 where the oily ferrous waste comprises up to 25% of the ferrous charge mixture.

5. The method of claim 4 where the oily ferrous waste and petroleum coke are mixed prior to being introduced into said melter gasifier.

6. An iron making process comprising the steps of introducing petroleum coke including the heavy metals contained therein into a melter gasifier; blowing oxygen containing gas into said melter gasifier and combusting petroleum coke to form at least a first fluidized bed of coke particles from said petroleum coke; introducing oily hydrocarbon containing ferrous waste into said melter gasifier through an entry port in the upper portion thereof; reacting petroleum coke, oxygen and oily ferrous waste in said melter gasifier to combust the major portion of said petroleum coke to produce reduction gas including vaporized and reformed hydrocarbons from said oily ferrous waste and molten iron containing heavy metals freed from combustion of the petroleum coke and a slag containing sulfur freed from combustion of the petroleum coke; flowing reduction gas to a reduction furnace which is operably connected to said melter gasifier, passing said reduction gas upward through iron ore in said reduction furnace to convert the iron ore to metallic sponge iron and to carbonize the sponge iron and feeding said sponge iron to the melter gasifier for further processing.

7. The method of claim 6 further characterized in that the temperature of the reaction is about 1100° C.

8. The method of claim 6 further characterized in that reduced iron ore is introduced into said melter gasifier concurrently with said oily ferrous waste to form a ferrous charge mixture.

9. The method of claim 8 where the oily ferrous waste comprise up to 25% of the ferrous charge mixture.

10. The method of claim 8 where oily ferrous waste and petroleum coke are pre-mixed prior to introduction into said melter gasifier.

11. The method of claim 9 where oily ferrous waste and petroleum coke are mixed prior to introduction into said melter gasifier.

12. A method for making liquid iron from oily ferrous waste in an environmentally acceptable manner comprising the steps of introducing petroleum coke and oily hydrocarbon containing ferrous waste into a melter gasifier; blowing oxygen containing gas into said melter gasifier; and reacting the petroleum coke and oily ferrous waste mixture with oxygen at a temperature of at least 1050° C. in said melter gasifier to combust the major portion of said petroleum coke, vaporize the hydrocarbons from the oily ferrous waste and produce reduction gas and molten iron.

13. The method of claim 12 further characterized in that the temperature of the reaction is about 1100° C.

14. The method of claim 12 further characterized in that reduced iron ore is introduced into said melter gasifier concurrently with said oily ferrous waste to form a ferrous charge mixture.

15. The method of claim 14 where the oily ferrous waste comprises up to 25% of the ferrous charge mixture.

16. The method of claim 15 where the oily ferrous waste and petroleum coke are mixed prior to being introduced into said melter gasifier.

* * * * *